(12) United States Patent
Sweeney

(10) Patent No.: US 8,108,372 B2
(45) Date of Patent: Jan. 31, 2012

(54) INFORMATION GATHERING SYSTEM AND METHOD

(76) Inventor: Jennifer Sweeney, Doylestown, PA (US)

(\*) Notice: Subject to any disclaimer, the term of this patent is extended or adjusted under 35 U.S.C. 154(b) by 0 days.

(21) Appl. No.: 11/641,158

(22) Filed: Dec. 19, 2006

(65) Prior Publication Data
US 2007/0220433 A1    Sep. 20, 2007

Related U.S. Application Data

(60) Provisional application No. 60/751,594, filed on Dec. 19, 2005.

(51) Int. Cl.
*G06F 17/30* (2006.01)

(52) U.S. Cl. .................... 707/705; 705/26.81; 705/26.5; 705/26.1; 705/26.8

(58) Field of Classification Search ............... 707/104.1, 707/3, 102, 203; 715/210; 705/26.81, 26.5, 705/26.1, 26.8
See application file for complete search history.

(56) References Cited

U.S. PATENT DOCUMENTS

| | | | | |
|---|---|---|---|---|
| 5,495,567 A | * | 2/1996 | Iizawa et al. | 715/762 |
| 5,555,496 A | * | 9/1996 | Tackbary et al. | 705/26.81 |
| 5,960,412 A | * | 9/1999 | Tackbary et al. | 705/26.5 |
| 6,092,054 A | * | 7/2000 | Tackbary et al. | 705/26.1 |
| 6,557,017 B1 | * | 4/2003 | Venable | 715/210 |
| 6,873,971 B1 | * | 3/2005 | Tackbary et al. | 705/26.8 |
| 2002/0002558 A1 | * | 1/2002 | Krause | 707/104.1 |
| 2004/0264810 A1 | * | 12/2004 | Taugher et al. | 382/305 |
| 2005/0033735 A1 | * | 2/2005 | Shapiro | 707/3 |
| 2005/0165726 A1 | | 7/2005 | Kawell, Jr. | |
| 2006/0031245 A1 | * | 2/2006 | Krieglstein | 707/102 |
| 2008/0021920 A1 | * | 1/2008 | Shapiro et al. | 707/102 |

FOREIGN PATENT DOCUMENTS

WO    WO 00/72237 A1    11/2000

\* cited by examiner

*Primary Examiner* — Shree Brown
(74) *Attorney, Agent, or Firm* — Dilworth Paxson LLP; John W. Goldschmidt, Jr.

(57) ABSTRACT

A system and method for compiling selected information from a plurality of individuals is disclosed. The system and method of this invention may include a first portion comprising a plurality of criteria identifiers, such as a birth date, birth year, age, zodiac sign, name, profession, nationality, country of citizenship, favorite sport, hobby or interest, or other criteria. Each criteria identifier may display to a user the criteria for selecting the individual to input said selected information such as an individual's signature or other information. The system and method may also include a second portion comprising one or more storage elements, each storage element being associated with at least one of the criteria identifiers for storing and inputting the selected information. Once information is input into a particular storage element, that specific criteria identifier (e.g. birth date) associated with the storage element may be eliminated from being used to select an individual. A computerized or interactive on-line version of the system and method of this invention is also disclosed.

20 Claims, 8 Drawing Sheets

The On-line Signature Birthday Book

My Book, a place for signatures...
LAUNCHING
The one and only on-line
Signature Birthday Book
Meet me in my book
Click here to check out what it's all about!

FIG. 3

It's a challenge...a game...a tool for making new friends...

It's the Signature Birthday Book!

The object is simple, the uses many

Activate your on-line book now and see how long it will take you to fill your book!

Inside the book are open entries for every day of the year,

Your job is to invite people to your book and have them sign their name next to their birthday along with a personal message of their choice. For example, how they met you or the city and town they are from.

The signer also has the option to insert their picture or download a song!

Create a competition among friends to see who can fill their book first.

This is a unique way to meet interesting people and make new friends and ultimately a personal treasured keepsake.

Now is the time to get started on your on-line book.

How long will it take you???

FIG. 4

Prices and Registration

Book Activation (one time fee)
Basic Book: 2 colors of your choice $4.00
Plus Book: 3 colors of your choice $5.00
Themed Book: $8.00
Charitable: $10.00 (proceeds go to your selected charity)
Create your own: $15.00

Fees
- Inviting someone to sign your book $0.10 for each signature. Only one signature per date. Additional signatures outside the required date is $0.05
- Multimedia uploads: $0.50 (the signer pays this fee, not the book owner)

- You will be billed on a monthly basis.
- You must have a credit card on file to activate, accept signatures or use the multimedia uploads.
- You must be at least 14 years of age
- You will be given a password once registration is complete. You will use this whenever you are using your book.

- Click here to activate your book or to register so you can sign other peoples books!

FIG. 5

Book Sample and Instructions

Page through until you find your birthday, Click on the first line and enter your name,
Tab to the next line where you have 200 characters to write your message
If you wish to upload a multi-media item (photo, song) tab to third line and follow instructions.
You will be charged $.050 for each upload  You have the option to upload both a song or a photo Click Here to see what contests are running now!

January

If your birthday has been signed, you can sign on the opposite page. No uploads are allowed Click here to get your physical Signature Birthday Book!

FIG. 7

INFORMATION GATHERING SYSTEM AND METHOD

CROSS-REFERENCE TO RELATED APPLICATIONS

This application claims the priority of U.S. Provisional Patent Application Ser. No. 60/751,594, filed Dec. 19, 2005, entitled "Information Gathering System and Method," under 35 U.S.C. §119 (e), the entire contents of which are incorporated herein by reference.

FIELD OF THE INVENTION

The present invention relates to the compilation, storage and/or retrieval of information. More specifically, the present invention relates to the compilation, storage and/or retrieval of certain information from a plurality of individuals that meet a certain criteria, such as for example signatures and other information related to individuals and/or encounters with individuals, or other information.

BACKGROUND OF THE INVENTION

Current autograph books simply allow a user to get as many autographs as he/she is able to retrieve. However, such autograph books do not permit the autographs to be organized, easily retrieved or located in the book. Nor do such books provide a system or method of recording other data related to the signatory. These deficiencies are also true of many other information gathering systems.

In today's society, information gathering systems take many forms. However, there exists a need for an information gathering system and method which enables the compilation, storage and retrieval of information associated with particular criteria, such as a birthday. For example, there exists the need for a system and method of compiling, storing and retrieving signatures and other information associated with the signatory having a particular birthday.

SUMMARY OF THE INVENTION

The present invention relates to a system and method for compiling selected information from a plurality of individuals comprising: (1) a first portion comprising a plurality of criteria identifiers, each for displaying to a user the criteria for selecting an individual to input selected information; and (2) a second portion comprising one or more of storage elements, each storage element associated with one of the criteria identifiers for inputting and storing the selected information related to the selected individual. Once the storage element has information entered in it, the storage element is no longer available, thus eliminating the criteria identifier associated with the used storage element from being used to select another individual. In one embodiment of the invention, the system and method may take the form of an autograph book in which signatures and other data related to the signatory, and/or information related to the event associated with the signing of the book may be compiled, stored and/or retrieved. In yet another embodiment of the invention, it may be possible to allow for data related to a particular criteria identifier to be associated with more than one individual. The invention may also may be computerized and/or be made available in and interactive, on-line environment such as on MySpace-.com or otherwise be internet based.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing summary and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 3 is a depiction of the home screen of an interactive internet based embodiment of the system and method of this invention.

FIG. 4 is a depiction of an instruction screen of the embodiment of FIG. 3.

FIG. 5 is a depiction of a pricing and registration screen of the embodiment of FIG. 3.

FIG. 7 is a depiction of an instruction screen for the use of the interactive internet based system and method of the embodiment of FIG. 3.

DETAILED DESCRIPTION

The instant invention is directed to a system and method for compiling selected information from a plurality of individuals. The system and method of this invention may include a first portion comprising a plurality of criteria identifiers, such as a birth date, birth year, age, zodiac sign, name, profession, nationality, country of citizenship, favorite sport, hobby or interest, or other criteria. Each criteria identifier may display to a user the criteria for selecting the individual to input said selected information such as an individual's signature or other information. For example, if a birth date is the criteria identifier, then the individual selected by the user for imputing information into the system will have a birth date corresponding to the criteria identifier.

The system and method may also include a second portion comprising one or more storage elements, each storage element being associated with at least one of the criteria identifiers for storing and inputting the selected information. For example, if a birth date is the criteria identifier, and the selected individual's signature is the information being compiled, then the individual's signature may be entered in the storage element. The storage element may comprise any appropriate storage device. For example, the storage element may be an area on a calendar or date book or in a computer or digital database corresponding to the birth date of the individual in which the individual may input their signature.

Once information is input into a particular storage element, that specific criteria identifier (e.g. birth date) associated with the storage element may be eliminated from being used by the user to select an individual. This system and method of this invention may also be partially or fully automated by way of non-limiting example, via a computer system or interactive, on-line system.

Reference will now be made in detail to the preferred embodiment of the present invention, example of which is illustrated in the accompanying drawings.

Figure 1:
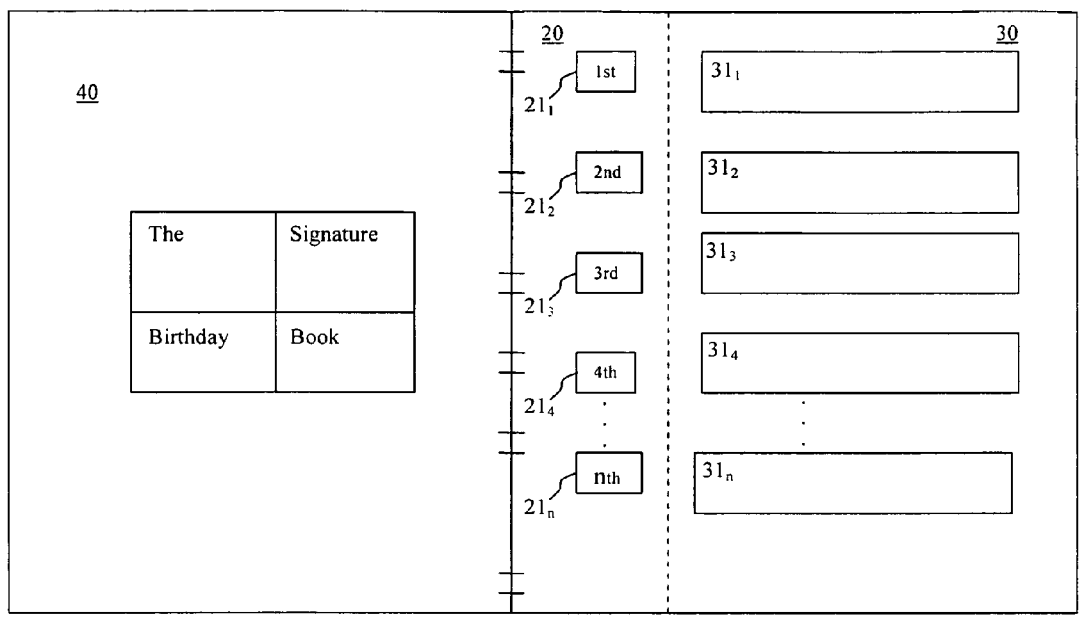
FIG. 1 is an exemplary illustration of an information gathering system in accordance with a preferred embodiment of the present invention.

An exemplary illustration of an information gathering system 10 in accordance with a preferred embodiment of the present invention is shown in FIG. 1. As illustrated in FIG. 1, a preferred embodiment of system 10 is a signature book, wherein the user of system 10 attempts to retrieve the signatures of selected individuals having birthdays on the dates indicated on the page. It should be noted that other signature books and information gathering systems may be developed in accordance with the preferred embodiment of the present invention. In addition, manual embodiments of this invention the system and method of this invention may be automated by way of, for example, computerized systems, and interactive as well as non-interactive websites.

Referring to FIG. 1, information gathering system 10 comprises a first portion 20 and a second portion 30. First portion 20 comprises a plurality of criteria identifiers $21_1 \ldots 21_n$ for presenting selected criteria information to the user of system 10. Criteria identifiers 21 assist the user in the selection of an individual to retrieve certain information. For example, in exemplary system 10 shown in FIG. 1, criteria identifiers 21 are calendar dates, corresponding to the birth date of a signatory. The user therefore finds and selects individuals having birthdays on the dates indicated by criteria identifiers 21. Although, birth dates are illustrated in the preferred embodiment of the present invention, it should be noted that other criteria may be used to select individuals, i.e., birth year, age, zodiac sign, name, profession, nationality, country of citizenship, and the like. It is preferable that each criteria identifier 21 be distinct from each other, i.e., no two criteria identifiers are the same, although in certain embodiments one or more of criteria identifiers 21 may be the same.

Adjacent to first portion 20, as illustrated in FIG. 1, second portion 30 comprises a plurality of storage elements $31_1 \ldots 31_n$ for inputting and storing certain information of the selected individuals. It is preferable that each storage element 31 be associated with only one of the plurality of criteria identifiers 21, such that each criteria identifier 21 is associated with a single individual and the individuals' input information, although in certain embodiments one or more storage elements 31 may be associated with more than one of criteria identifier 21.

In the illustrated embodiment of FIG. 1, storage element 31 is a signature line, wherein each selected individual inputs his/her signature. The signature is stored in the signature box and no longer available for further input. Although a signature box has been exemplified in FIG. 1, it should be noted that other storage elements 31 be used, for example, a picture box, one or more lines for input of a statement, address, location, date or other information, or other appropriate storage element 31. Alternatively, such information may be collected, stored and/or retrieved on a computer, website or other system.

In addition, various other information may be input and stored in storage elements 31 such as the date upon which and/or the location where the signature was obtained, information related to a discussion the signatory had with the user, or other information desired to be recorded and/or stored.

Although first portion 20 and second portion 30 have been illustrated as adjacent to one another, it should be noted that these portions 20, 30 may be arranged other ways as well, for example, first portion 20 may appear on the top, on the bottom, on either side, or otherwise be associated with second portion 30.

In accordance with the embodiment of the present invention illustrated in FIG. 1, system 10 further comprises a system identifying portion 40 for displaying the title of system 10. As exemplified, system identifying portion 40 indicates that system 10 is "The Signature Birthday Book." As illustrated in FIG. 1, system identifying portion 40 may be separated from first portion 20 and second portion 30 by, for example, a binding or other separator, such that system 10 models a book, and wherein one or more pages of system 10 comprises system identifying portion 40, included on the left page and one or more criteria identifiers 21 and one or more associated storage elements 31, each included on the right page.

Figure 2:
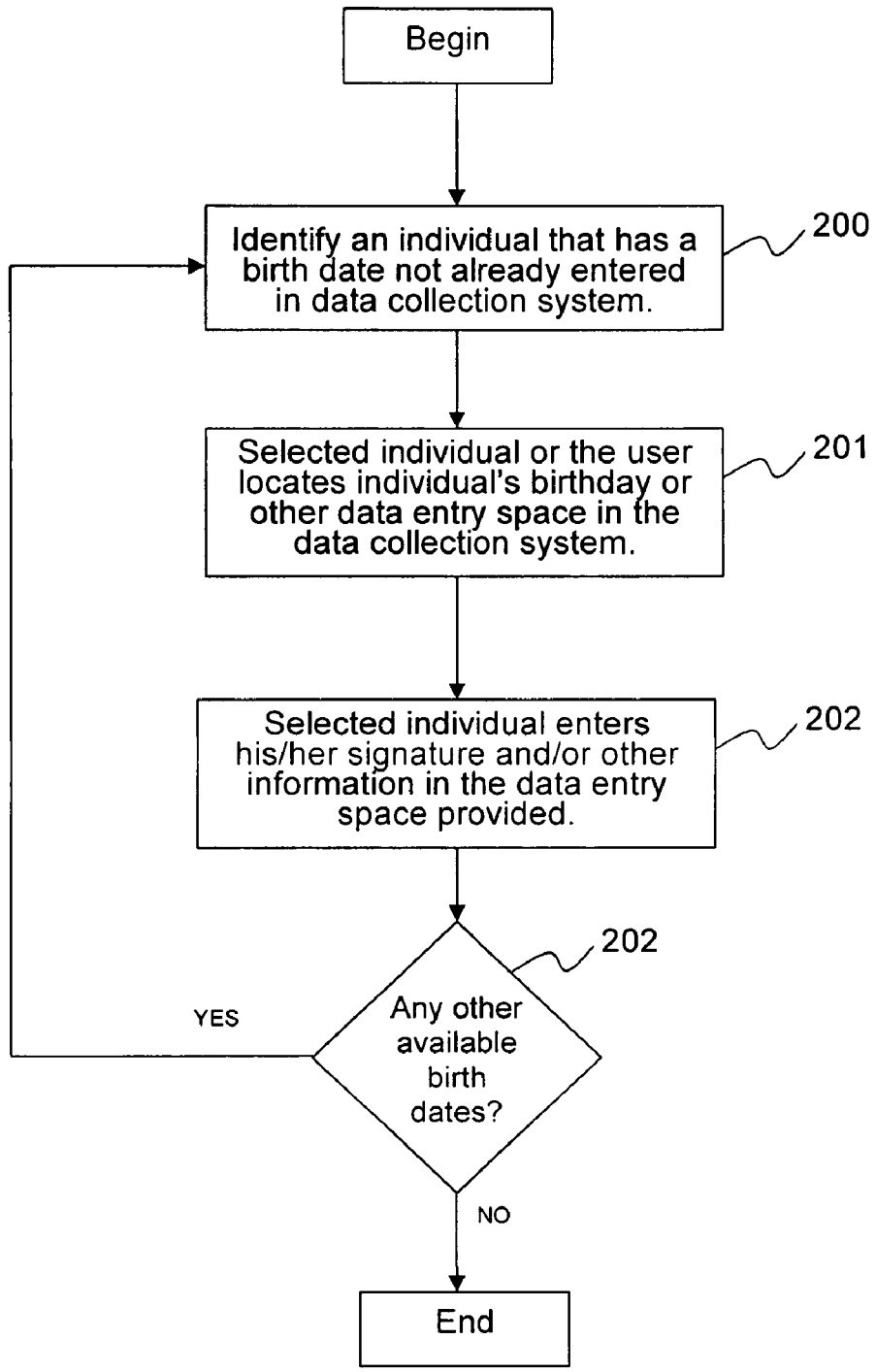
FIG. 2 is a flow diagram of a method of information gathering in accordance with a preferred embodiment of the present invention.

A preferred method of gathering information in accordance with a preferred embodiment of the present invention is illustrated in the flow diagram of FIG. 2. The user of system 10 locates, finds or otherwise identifies an individual that meets the criteria set forth in one of the criteria identifiers 21 (step 200). In this embodiment, the user identifies an individual having a birthday on a birth date wherein the signature line has not been filled in with another's information. Once an appropriate individual fitting the appropriate criteria is identified by the user or by other means, the identified individual, the user, or other party locates the appropriate criteria identifier 21 (step 201), and the individual, user or other party inputs the appropriate information in the storage element 31 associated with criteria identifier 21 (step 202).

In a preferred embodiment, the individual finds his/her birthday and signs his/her name on the signature line associated with his/her birthday. Other information also may be input by the individual, user or other party, either contemporaneously at the time of signing, or at some other time. If there are any available storage elements 31 (e.g., unsigned birth dates) after the individual inputs his/her signature, the user preferably conducts a search for another individual who meets the criteria associated with an available criteria identifier 21. If there are no other available criteria identifiers 21, then system 10 has been substantially filled to capacity and is available to continue to store and/or have information retrieved from the system.

Also, incorporated herein is another embodiment of the invention entitled "The Signature Birthday Book—Wanna Sign My Gift?", attached hereto as Exhibit A, which is exemplary of the system and method and is illustrative of aspects of the present invention. In the embodiment of the system shown therein, signatures of persons having birthdays corresponding to a particular day of the year may be entered, stored and/or retrieved. Additional information relating to the signatory or event related to the signing of the book may also be entered, stored and/or retrieved from the system such as, for example the date, place and circumstances related to the acquisition of the signature.

In yet other embodiments of the invention, different themes related to the type of information gathered may also be incorporated into system 10. For example, information, including signatures of celebrities, sports figures, politicians, and the like may be stored in system 10, as well as information related to such individuals such as, for example, the individual's greatest accomplishment, the identity of the signatory's most admired person, as well as other information related or unrelated to the signatory.

In yet other embodiments, multiple systems 10 of the invention may be utilized to collect the same or different types of information to store individually or collectively in one or more information collection systems.

Users of the system may also compete against each other to see, for example which user is able to complete their information collection system first. For example, users may compete against each other by using the birthday book embodiment of the invention, with the object of the competition being to be the first to acquire and record one signature (and optionally other information) of a person having a birthday corresponding to each day of the year, month, week or other established parameter.

The instant invention may also be integrated into a computerized, digital, interactive, on-line or internet based embodiments. By way of non-limiting example, there is shown in FIGS. 3 through 8, an interactive, internet based embodiment of the system and method of this invention.

More specifically, FIG. 3 is depicts the home screen of an interactive, internet site or on-line based embodiment of the system and method of this invention. In this embodiment, a user may collect the signatures of persons who have birthdays on various days of the year (referred to herein as the "Signature Birthday Book"). On the page of FIG. 3, a prospective user is greeted and may enter the site buy launching.

FIG. 4 is depicts the instruction screen of the embodiment of FIG. 3 in which the nature of the system and method of the invention is explained to the user. In this embodiment, the manner in which the Signature Birthday Book may be used is described to the user. The object of the Signature Birthday Book embodiment is to obtain the signatures of, and, optionally, other information about persons having birthdays corresponding to particular days of the year. Such other information may include, but not be limited to, personal messages, an explanation of how the person knows the user, the city and town the person is from, preferences in music, movies or other activities. The person signing the book may also optionally download photographs, music or other information in digital or other acceptable form.

Furthermore, competitions, games and other activities of interest to users and persons signing the Signature Birthday Book of this embodiment may be suggested or implemented at the screen of FIG. 4. By way of non-limiting example, multiple users of the Signature Birthday Book of this embodiment may be challenged to see who can obtain signatures from persons having birthdays corresponding to each day of the calendar year. Among other features, this embodiment may provide a vehicle for business and social interaction such as, for example, socially meeting new people and business networking. The Signature Birthday Book of this invention may also become a collectable for users to retain or exchange with others.

FIG. 5 depicts a pricing and registration screen of the embodiment of FIG. 3. At this screen a user may be advised of the pricing plans for using the site. Such pricing plans may take any form including but not limited to a one time fee for book activation and a choice of optional features for additional fees. Such optional features may include adding additional colors to the Signature Birthday Book, selecting a specialized theme for the Signature Birthday Book such as music, sports, school, or other interest or topic, making charitable contributions or having charitable organizations receive donations based upon the usage of the user's Signature Birthday Book, customizing the book, or any other optional feature. Each optional feature may have an individual fee associated with such feature, or multiple features may be offered or "bundled" into "packages" at established fees.

The terms and conditions of billing and payment may also be disclosed on the screen of FIG. 5. Fees may be billed at any interval and, optionally, may be charged to a credit card or other acceptable payment form. Restrictions on site usage, such as age or other qualification, may also be presented at the screen of FIG. 5. Users may also activate a book, or register to sign other user's books at the screen of FIG. 5 by clicking through the screen of FIG. 6.

Figure 6:
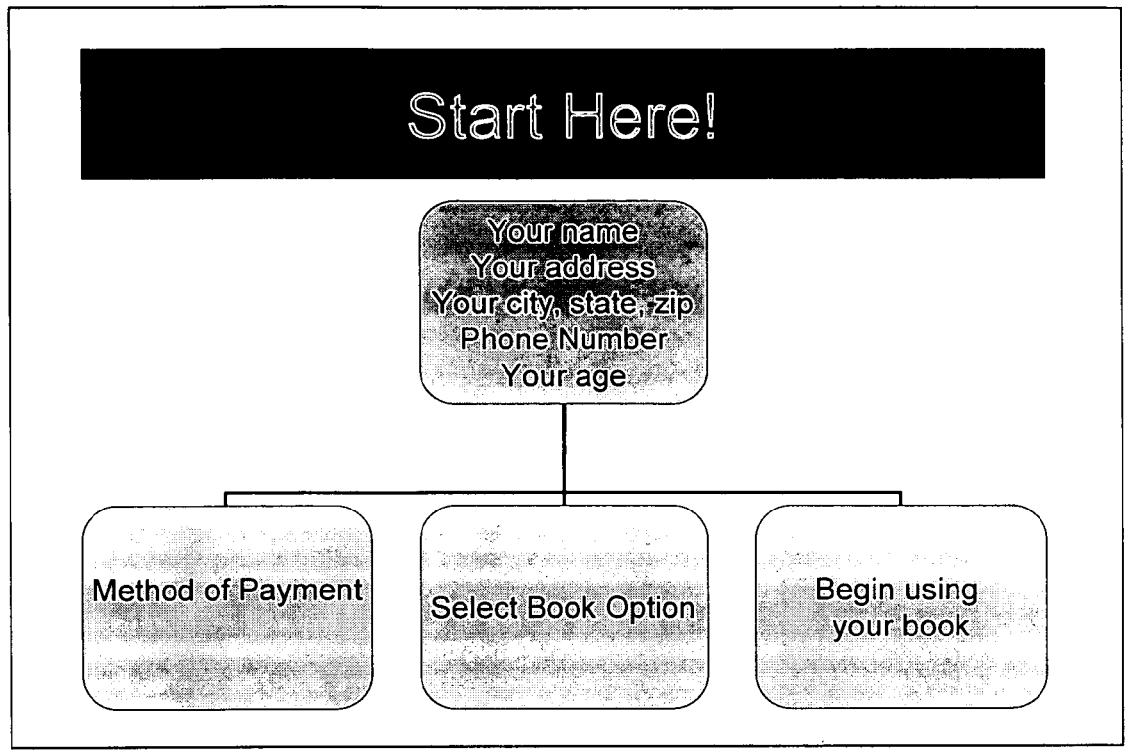
FIG. 6 is a depiction of a user activation and/or registration data input screen of the embodiment of FIG. 3.

FIG. 6 depicts a user activation and/or registration data input screen of the embodiment of FIG. 3. User information such as name, address, telephone number and age may be gathered at this location. Credit card or other payment information, selection of book options and features may also be identified at the screen of FIG. 6. Once all data is input to the site and, optionally, verified, the book may be activated and the user may begin using the book by clicking through to the screen of FIG. 7. A similar data entry process may also be utilized in order for a user to register to sign other persons' books.

FIG. 7 depicts an instruction screen for the use of the interactive internet based system and method of the embodiment of FIG. 3. After entering data from the screen of FIG. 6, a user may then allow others (hereinafter referred to as "visitors") to use the book depicted in FIG. 7. In this embodiment, a visitor to the book shown may page through the book to find the page corresponding to that visitor's birthday. If that page has not been completed, then the current visitor may fill in as much information as the page requires, permits, and/or the visitor desires to input. Optionally, provision may also be made for multiple visitors having the same birthday to enter information.

By way of non-limiting example, the visitor may enter the visitor's name on a first line or other data entry field presented which corresponds to the birth date. A message may be entered on a second line or field. Data such as photographs, music or other data may also be entered in subsequent lines or fields.

Hyperlinks or other connections may be made to other books, websites or locations at any point in the book. For example, as shown in FIG. 7 a hyperlink may be presented to a visitor to be able to view any contests which may be running between multiple users regarding the completion of their respective books. A hyperlink may also be presented to permit visitors to purchase a hard copy of the Signature Birthday Book.

Figure 8:
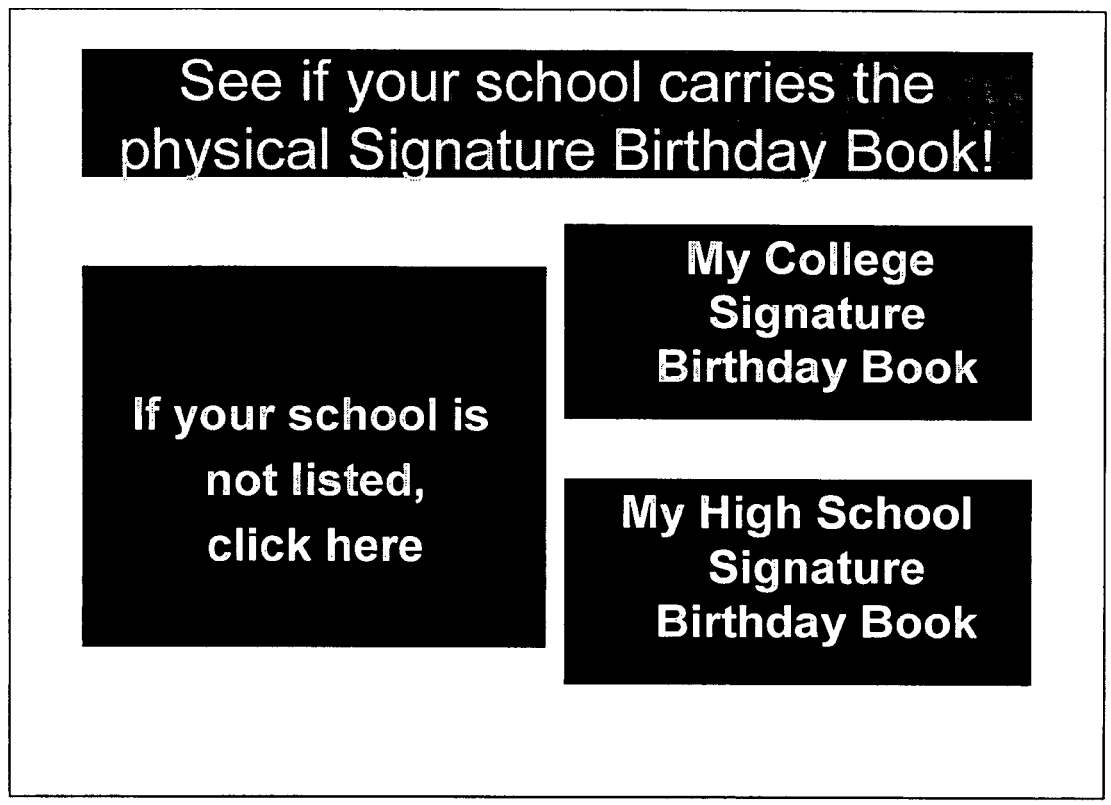
FIG. 8 is a depiction of a specialty group screen of the embodiment of FIG. 3.

FIG. 8 depicts a specialty group screen of the site of the embodiment of FIG. 3. Here, the site may provide connectivity, buy way of, for example, a hyperlink, to other data maintained on the site. For example, persons interested in determining whether groups in which they have an interest are maintaining a book may check the site of this embodiment. In the embodiment shown, a listing of schools which maintain a book on the site is presented to a user. If a school of interest is listed, the book may be accessed by a registered user and data may be entered as described above. If a school of interest is not listed, the identity of the school may be input by the user. The site may also maintain a listing of schools which may distribute hard copies of the book. Other specialty group books may also be made available on the site. Such groups may include, but may not be limited to, athletic teams, music artists, clubs, societies, professional organizations and the like.

It will be apparent to those skilled in the art that various modifications and variation can be made to the present invention without departing from the spirit or scope of the invention. Thus, it is intended that the present invention cover such modifications and variations of this invention provided such modifications and variations come within the scope of the appended claims and their equivalents.

What is claimed is:

1. A method for users of a computerized information gathering system comprising a data processor to compete against each other in a competition, said method comprising the steps of:
   (a) receiving into said information gathering system selected established parameters comprising information relating to a first individual having an annual birthday comprising a month and a day of a calendar year on which said first individual having an annual birthday comprising a month and a day of a calendar year which corresponds to said first individual's birthday;
   (b) associating said selected information relating to said first individual to said first individual's birthday;
   (c) receiving into said information gathering system selected information relating to a subsequent individual having an annual birthday which corresponds to a different annual birthday than that of any individual already received into said information gathering system, and therein not allowing more than one individual to be associated in said system with any one birthday;
   (d) associating said selected information relating to said subsequent individual to said subsequent individual's birthday;
   (e) determining if said selected information relating to individuals who, as a group, collectively possess all existing annual birthdays by utilizing said processor; and
   (f) repeating steps (c) through (e) until a said selected information relating to individuals who, as a group, collectively possess all existing annual birthdays, whereupon said competition among said users is concluded.

2. The method of claim 1, wherein said selected information relating to each said individual may comprise one or more of said individual's name, signature, address, e-mail address, hometown, date said individual met a user of said information gathering system, birth year, age, zodiac sign, profession, nationality, country of citizenship, favorite sport, favorite hobby, and favorite interest.

3. The method of claim 1, wherein each user may access said user's own information gathering system to compete against other users to be the first to enter said selected information relating to individuals who, as a group, collectively possess all existing annual birthdays.

4. The method of claim 1, wherein said all existing annual birthdays consists of 366 different annual birthdays.

5. The method of claim 2, wherein each user accesses said user's own information gathering system to compete against other users to be the first to enter said selected information relating to individuals who, as a group, collectively possess all existing annual birthdays.

6. The method of claim 2, wherein said all existing annual birthdays consists of 366different annual birthdays.

7. The method of claim 3, wherein said all existing annual birthdays consists of 366 different annual birthdays.

8. The method of claim 5, wherein said all existing annual birthdays consists of 366 different annual birthdays.

9. A computerized system for compiling selected information from one or more individuals, comprising:
   an information storage device for inputting and storing names of an individuals each of whose annual birthday is associated with a corresponding to a unique birthday identifier;
   wherein said information storage device comprises:
   a first portion comprising 366 birthday identifiers, each said birthday identifier corresponding to a different annual birthday, each said annual birthday comprising a month and a day of a calendar year on which one individual annually celebrates said individual's birthday; and
   a second portion comprising one or more information storage elements associated with each said birthday identifier for inputting and storing said selected information related to said individual whose annual birthday corresponds to that of said annual birthday corresponding to said associated birthday identifier and whose name corresponds to said name inputted and stored in said associated birthday identifier; and
   wherein once an individual's name is associated with a birthday identifier, no other individual's name entered into said system may be associated with the same birthday identifier, therein not allowing more than one individual's name to be associated in said system with any one birthday.

10. The system of claim 9, wherein said selected information compiled from said individual may further comprise one or more of said individual's signature, address, e-mail address, hometown, date said individual met a user of said computerized system, birth year, age, zodiac sign, profession, nationality, country of citizenship, favorite sport, favorite hobby, and favorite interest.

11. The system of claim 9, wherein said system comprises one or both of a computer or website.

12. The system of claim 9, wherein said system comprises multiple systems wherein each such system may be accessible by one or more users.

13. The system of claim 9, wherein a user of said system may access said user's own system to compete against other users to be the first user to enter names of said individuals into all 366 said birthday identifiers and enter into all storage elements associated with each said birthday identifier said selected information related to said individual whose annual birthday corresponds to that of said annual birthday corresponding to said associated birthday identifier and whose name corresponds to said name inputted and stored in said associated birthday identifier.

14. A computerized information storage system for compiling selected information from one or more individuals, comprising:
   a plurality of storage devices organized together;
   wherein each said storage device contains one of 366 birthday identifiers, each said birthday identifier corresponding to a different annual birthday, each said annual birthday comprising a month and a day of a calendar year on which one said individual annually celebrates said individual's birthday;
   wherein said plurality of storage devices collectively comprise all 366 said birthday identifiers;
   wherein each storage device corresponding to each birthday identifier comprises a storage element for inputting and storing a single name of one individual whose annual birthday corresponds to that of said annual birthday corresponding to said birthday identifier; and
   wherein each of said storage devices further comprises one or more information storage elements associated with each said birthday identifier contained in each said storage device for inputting and storing said selected information related to said individual whose annual birthday corresponds to said associated birthday identifier and whose name corresponds to said name inputted and stored in said storage device, therein not allowing more than one individual's name to be associated in said storage system with any one birthday.

15. The system of claim 14, wherein said selected information compiled from said individual may comprise one or more of said individual's signature, address, e-mail address, hometown, date said individual met a user of said computerized system, birth year, age, zodiac sign, profession, nationality, country of citizenship, favorite sport, favorite hobby, and favorite interest.

16. The system of claim 14, wherein said system comprises one or both of a computer or website.

17. The system of claim 14, wherein said system comprises multiple systems wherein each such system may be accessible by one or more users.

18. The system of claim 14, wherein a user of said system may access a computerized storage device to compete in a competition against other users of said system to be the first user to enter names of individuals into all 366 birthday identifiers.

19. The system of claim 14, wherein a user of said system may access a computerized storage device to compete in a competition against other users of said system to be the first user to enter into all storage elements associated with each said birthday identifier said selected information related to said individual whose annual birthday corresponds to that of said annual birthday corresponding to said associated birthday identifier, and whose name corresponds to said name stored in said associated birthday identifier.

20. The system of claim 19, wherein said selected information relating to each said individual may comprise one or more of said individual's name, signature, address, e-mail address, hometown, date said individual met a user of said information gathering system, birth year, age, zodiac sign, profession, nationality, country of citizenship, favorite sport, favorite hobby, and favorite interest.

* * * * *